United States Patent [19]

Hara

[11] Patent Number: 5,796,857

[45] Date of Patent: Aug. 18, 1998

[54] APPARATUS FOR FINGERPRINT VERIFICATION USING DIFFERENT VERIFICATION METHOD IN ACCORDANCE WITH QUALITY GRADE DATA

[75] Inventor: Masanori Hara, Tokyo, Japan

[73] Assignee: NEC Corporation, Tokyo, Japan

[21] Appl. No.: 900,918

[22] Filed: Jul. 28, 1997

Related U.S. Application Data

[63] Continuation of Ser. No. 313,566, Sep. 29, 1994, abandoned.

[30] Foreign Application Priority Data

Oct. 21, 1993 [JP] Japan ................................ 5-263246

[51] Int. Cl.$^6$ .............................. G06K 9/00; G06K 9/46; G06K 9/66; G06K 9/52
[52] U.S. Cl. ..................... 382/124; 382/125; 382/190; 382/206
[58] Field of Search ...................... 382/116, 124, 382/125, 126, 127, 148, 159, 160, 187, 190, 191, 206, 227; 283/68, 69, 70; 356/71

[56] References Cited

U.S. PATENT DOCUMENTS

| | | | |
|---|---|---|---|
| 4,047,154 | 9/1977 | Vitols et al. | 382/125 |
| 4,525,859 | 7/1985 | Bowles et al. | 382/125 |
| 4,581,760 | 4/1986 | Schiller et al. | 382/124 |
| 4,618,988 | 10/1986 | Schiller | 382/125 |
| 4,811,414 | 3/1989 | Fishbine et al. | 382/124 |
| 4,944,021 | 7/1990 | Hoshino et al. | 382/125 |
| 5,054,090 | 10/1991 | Knight et al. | 382/127 |
| 5,109,428 | 4/1992 | Igaki et al. | 382/125 |

FOREIGN PATENT DOCUMENTS

| | | | |
|---|---|---|---|
| 56-24675 | 3/1981 | Japan | G06K 9/52 |
| 59-142676 | 8/1984 | Japan | G06K 9/00 |
| 63-150781 | 6/1988 | Japan | G06K 9/00 |
| 1-211184 | 8/1989 | Japan | G06K 15/62 |
| 3-127192 | 5/1991 | Japan | G06K 9/00 |
| 2 278 945 | 12/1994 | United Kingdom | G06K 9/80 |

OTHER PUBLICATIONS

"Fingerprint Based Person Verification System", *IBM Technical Disclosure Bulletin* 17(12): 3741-3743 (1975).

Primary Examiner—Bipin Shalwala
Attorney, Agent, or Firm—Foley & Lardner

[57] ABSTRACT

Feature points data and quality grade data of fingerprint images are stored in a data base with a respective register number of each fingerprint as an index for access. A verification method dictionary contains different verification methods for different quality grade data. A verifier unit refers to the verification method dictionary to select a verification method adapted for the quality grade data of the fingerprint to be compared.

10 Claims, 5 Drawing Sheets

FIG.6

| QUALITY GRADE DATA | | VERIFICATION METHOD | | |
|---|---|---|---|---|
| | | FEATURE POINTS EXTRACTION AREA (L×H) | DATA AND METHOD FOR VERIFICATION | |
| 1 | A HIGH | 12.8mm×12.8mm | RIDGE LINE DIRECTION | |
| 2 | B MEDIUM | 19.4mm×19.4mm | FEATURE POINTS | |
| 3 | C LOW | 25.6mm×25.6mm | FEATURE POINTS & RELATIONS | |
| | | | | |

# 5,796,857

APPARATUS FOR FINGERPRINT VERIFICATION USING DIFFERENT VERIFICATION METHOD IN ACCORDANCE WITH QUALITY GRADE DATA

This application is a continuation of application Ser. No. 08/313,566, filed Sep. 29, 1994 now abandoned.

BACKGROUND OF THE INVENTION

This invention relates to an apparatus for fingerprint verification, and more particularly to a fingerprint verification apparatus for individual person identification, for example, in an access control.

Fingerprints have been playing important roles in person identification, due to their important characteristics of unchangeability and uniqueness. Recently, an automatic fingerprint verification apparatus has been developed using pattern recognition technique by a computer. In the automatic apparatus, feature points in a fingerprint are detected, the feature points being, for example, end points which are terminal points of a ridge line, or bifurcation points which are points where two ridge lines meet.

Accurate extraction of feature points and careful comparison of feature points data are necessary for improving the reliability of verification. Fingerprint images are often smudged and unclear, and it will take a fairly long time to extract feature points accurately from these unclear fingerprint images.

Various proposals have been made for obtaining reliable result of verification in a reduced processing time. When fingerprint verification is used for access control, a fingerprint which is referred in a comparison is previously registered in a data base. A fingerprint to be verified is input through a same fingerprint image input unit through which the fingerprint in the data base is input. Although the same fingerprint image input unit is used for all the fingerprints to be verified, there are a wide variety in quality grade in the input images. This variety of quality grade of images seems to be inherent to surface conditions of a finger, and the quality grade of a fingerprint will not change for changed instances of input.

There have been proposals to use this quality grade of images or verification of a fingerprint. A Japanese patent application entitled "An apparatus for person identification by his fingerprint" which was laid open under a Provisional Publication No. 150781/'88, discloses an apparatus for measuring resolution of a fingerprint image, and storing the measured value of resolution in the data base. When data of a fingerprint are read out for a reference of comparison from the data base, the resolution is also read out, and the scanning rate of a fingerprint image under verification is determined in accordance with the value of resolution, thus avoiding unnecessary fine scanning for an image having a low grade resolution.

Another Japanese patent application entitled "A method of fingerprint verification" which was laid open under a Provisional Publication No. 127192/'91, discloses a method for measuring ridge line pitch of a fingerprint image, and storing the measured value of the pitch in the data base. This pitch is used for determining the scanning rate of a fingerprint image, the data of which is to be compared to that in the data base, thus avoiding unnecessary fine scanning for an image having a large ridge line pitch.

In another Japanese patent application entitled "An apparatus for person identification" which was laid open under a Provisional Publication No. 211184/'89, two images of a fingerprint are input when registering the fingerprint in the data base. Degree of similarity between these two images are measured, and the measured degree is also stored in the data base. When the data of a fingerprint are read out from the data base, the stored degree of similarity of the fingerprint is also read out to be used for determining a threshold value of comparison. Thus, an adequate threshold value is determined for verification.

In all these prior arts as disclosed under Provisional Publications No. 150781/'88, No. 127192/'91, and No. 211184/'89, quality grade information is used for improving only a limited process of verification. In the prior arts disclosed under Provisional Publications No. 150781/'88 and No. 127192/'91, only scanning rates are altered in accordance with the quality grade, and in the prior art disclosed under a Provisional Publication No. 211184/'89, only the threshold value of verification is changed in accordance with the quality grade. Other processes of verification are executed in a same way for an image of a high quality and for an image of a low quality. In general, there are processes necessary for an image of high quality and unnecessary for an image of low quality, and processes necessary for an image of low quality and unnecessary for an image of high quality. In all these prior arts described, it will be said that most of these unnecessary processes are not eliminated, and the verification of a fingerprint takes unnecessary long time.

SUMMARY OF THE INVENTION

Therefore, a primary object of this invention is to provide a fingerprint verification apparatus wherein a substantially different means for comparison is used for different quality grade.

In an embodiment of this invention, an apparatus for fingerprint verification comprising a data base wherein feature points data of fingerprints to be verified are registered with respective register number of each fingerprint as an index for access, a register number input unit for generating the register number of a fingerprint to be compared, a fingerprint image input unit for generating a fingerprint image of the fingerprint to be compared, a feature points extraction unit for extracting feature points data of the fingerprint image from the fingerprint image input unit, and a verifier unit for comparing the extracted feature points data and the feature points data read out from the data base accessed by the register number from the register number input unit; characterized in that:

quality grade data of fingerprints to be verified are further registered in the data base with respective register number of fingerprint as an index for access, there are further provided with a verification method dictionary wherein different verification methods are assigned for different quality grade data, and the verifier unit refers to the verification method dictionary by the quality grade data read out from the data base to determine the verification method for the fingerprint to be compared.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

3

Figure 1:
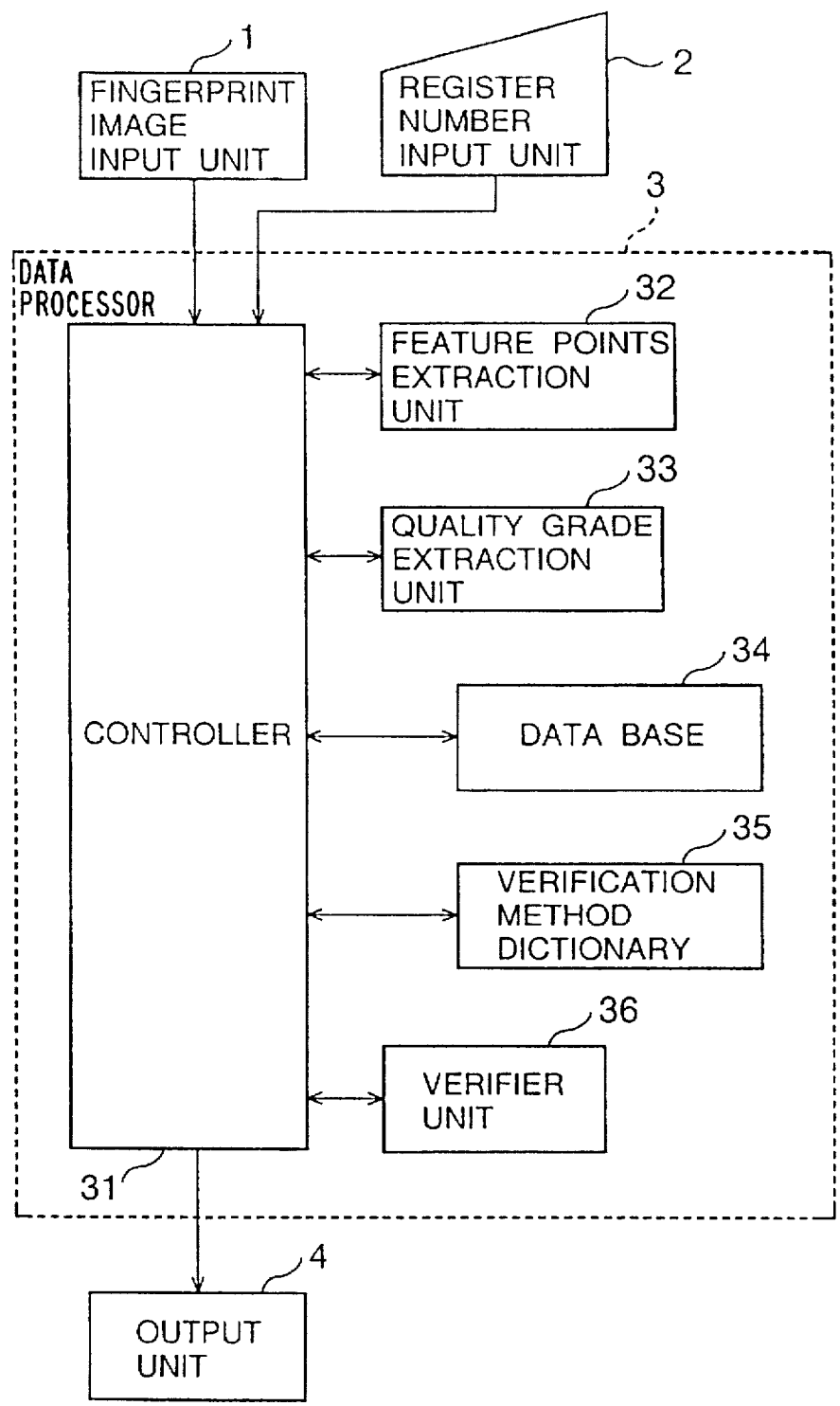

FIG. 1 shows a block diagram of an embodiment of this invention.

Figure 2:
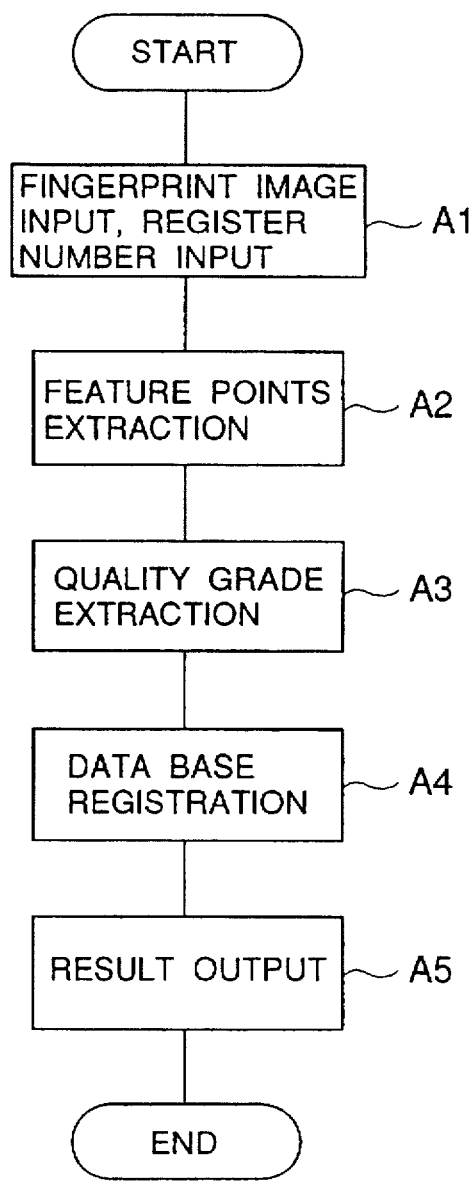

FIG. 2 shows a flow chart of registering reference data in a data base of this invention.

Figure 3:
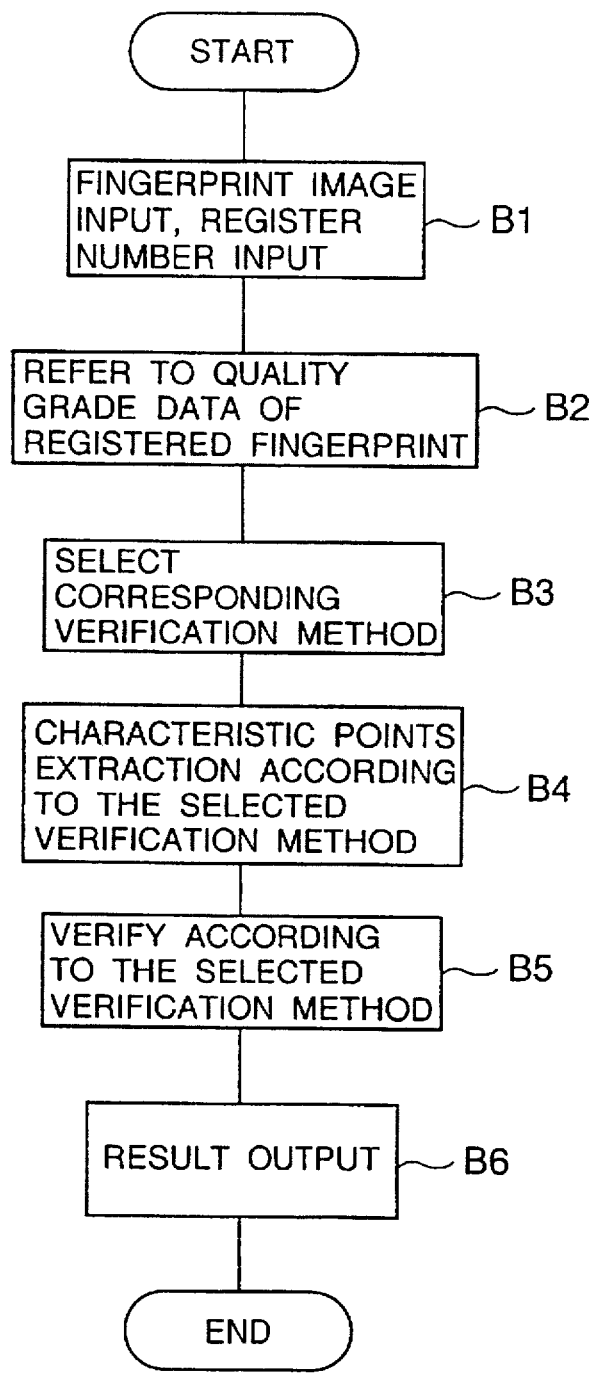

FIG. 3 shows a flow chart of verification in this invention.

Figures 4A, 4B:
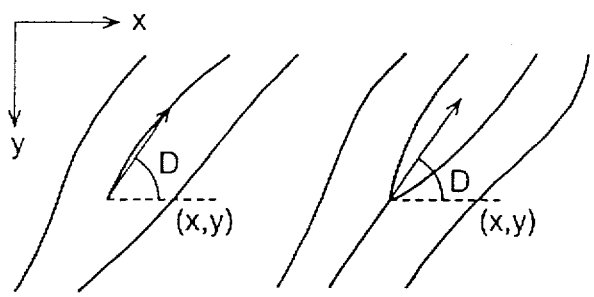

FIGS. 4A and 4B show two examples of feature points data of a fingerprint.

Figure 5A:
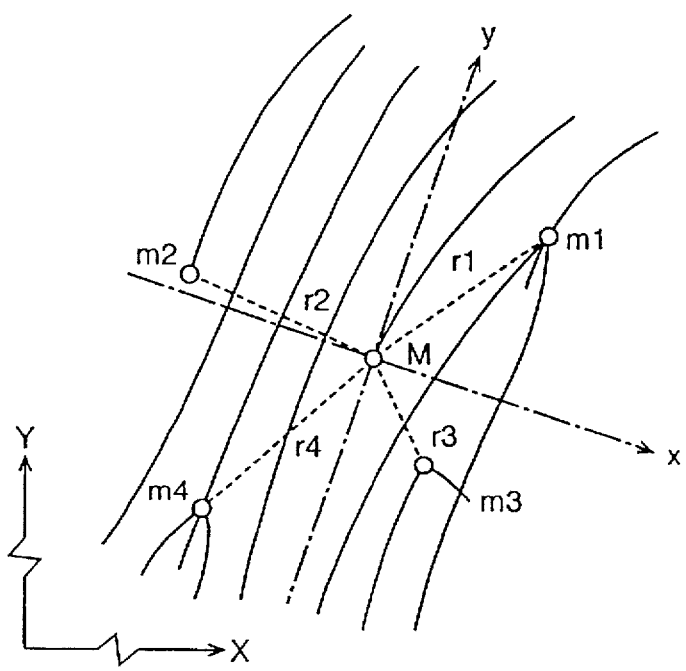
Figure 5B:
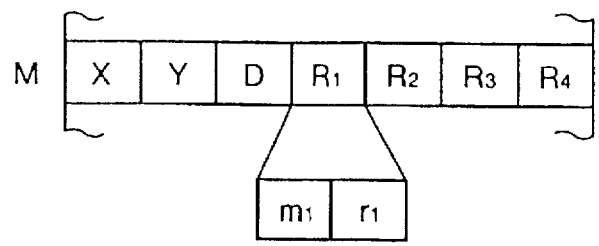

FIGS. 5A and 5B show another example of feature points data of a fingerprint.

FIG. 6 shows an example of a verification dictionary shown in FIG. 1.

DETAILED DESCRIPTION OF THE PREFERRED EMBODIMENTS

Referring to FIG. 1, an apparatus for fingerprint verification of this invention comprises a fingerprint image input unit 1 for converting a fingerprint picture to electrical signals, a register number input unit 2 which is a keyboard input unit, a data processor 3 for processing input data, and an output unit 4 for delivering the result of verification.

The processor 3 is usually constituted by a program control of a CPU and associated memories. The controller 31 includes the CPU, program memories and the working memories. A fingerprint image data from the fingerprint image input unit 1 is temporarily stored in a first buffer memory in the controller 31.

A feature points extraction unit 32 which is a function of the processor 3, extracts feature points data used for verification from the fingerprint image stored in the first buffer memory. A quality grade extraction unit 33 which is another function of the processor 3 extracts a quality grade data from the same fingerprint image. A data base 34 is, a memory for storing feature points data extracted at the feature points extraction unit 32 and the quality grade data extracted at the quality grade extraction unit 33, with a register number from the register number input key 2 as an index for access.

A verification method dictionary 35 is a memory wherein different verification processes are stored for different quality grade. A verifier unit 36 which is a function of the processor 3 compares feature points data extracted at the feature points extraction unit 32 to corresponding feature points data stored in the data base 34 by a verification process read out from the verification dictionary 35 in accordance with the quality grade of the fingerprint image.

Referring to FIG. 2, a process for storing filed data of fingerprints in the data base 34 is explained. At step A1, a fingerprint image is input from the fingerprint image input unit 1 to the first buffer memory in the controller 31, and a register number of the fingerprint image is keyed-in from the register number input unit 2 to a second buffer memory in the controller 31.

At step A2, the feature points extraction unit 32 extracts feature points data of the image stored in the first buffer memory, and stores the extracted data in a third buffer memory in the controller 31.

An example of feature points data is shown in FIGS 4A and 4B. Solid lines in represent ridge lines. An end point where a ridge line is terminated (FIG. 4A), and a bifurcation point where two ridge lines meet (FIG. 4B) are feature points. Feature point data include position(X, Y) of the feature point and a direction(D) of the feature point which is represented by the direction of the ridge line at the feature point.

FIGS. 5A and 5B show another example of feature points data. In the Publication of the Japanese Patent Application

4

No. 12674/'85 entitled "An apparatus for extracting pattern feature", feature points data of FIGS. 5 and the extraction apparatus are disclosed.

In FIG. 5A, M is a feature point of attention, and m1, m2, m3, m4 are neighboring feature points. In addition to coordinates position and the direction of the feature point M, number of ridge lines crossed by vectors M-m1, M-m2, M-m3, M-m4 are supplemented as feature points data of the fingerprint. These feature points data are described as shown by FIG. 5B. In FIG. 5B, X, Y, D are the coordinates position and the direction of the feature point M, and R1, R2, R3, R4 represents number of ridge lines r1, r2, r3, r4 crossed by vectors starting from M and ending at m1, m2, m3, m4 respectively. Ri is called the Relation between M and mi.

Now returning to FIG. 2, the quality grade extraction unit 33 extracts quality grade data from the fingerprint image stored in the first buffer memory in the controller 31 at step A3.

In the Publication of a Japanese Patent Application No. 27945/'84 entitled "An apparatus for ridge line direction determination", a fingerprint image is subdivided into plural subregions, and for each subregion, ridge line direction is determined from direction dependent density distribution in the subregion. When the density distribution in a subregion is disturbed by noise, the direction dependency is deteriorated and it will become difficult to determine ridge line direction of the subregion.

Therefore, a ratio of the number of subregions where ridge line direction is undeterminable to the total number of subregions, will be a measure of quality grade of the fingerprint image.

The extracted quality grade is classified, for example, as high, medium and low, and is stored in a fourth buffer memory in the controller 31.

In many cases, the feature points extraction unit 32 determines ridge line directions of subregions for the purpose of feature points extraction. In these cases, the feature points extraction unit 32 can provide the quality grade extraction unit 33 with ridge line directions data. The quality grade extraction unit 33 extracts the quality grade from the ridge line directions of subregions provided by the feature points extraction unit 32.

In this way, processing time of the quality grade extraction unit 33 can be reduced. At step A4, the controller 31 transfers the contents of the third buffer memory and the fourth buffer memory into the data base 34 with the register number in the second buffer memory as an index for access to these data in the data base 34. And at step A5, the controller 31 displays the result of registration as normal ending or as abnormal ending on the output unit 4.

For all the fingerprints to be registered, steps from A1 to A5 are repeated.

Referring now to FIG. 3, a verification process will be described. Step B1 is the same with the step A1, and the fingerprint image to be verified is stored in the first buffer memory, and the register number of the fingerprint is keyed-in to the second buffer memory from the register number input unit 2. At step B2, the data base 34 is accessed by the register number stored in the second buffer memory, and the quality grade data of the fingerprint image are read out on the fourth buffer memory, while the feature points data are read out on a fifth buffer memory in the controller 31.

At step B3, the verification method dictionary 35 is referred to by the contents of the fourth buffer memory (quality grade data). FIG. 6 shows an example of contents of the verification method dictionary 35, where feature points extraction area(L×H) and data for verification method are stored with classified quality grade data(high, medium, low)as an index for access. When the quality grade is low, larger areas must be compared, and more complicated data and method must be used for comparison.

In an example of FIG. 6, when the quality grade data is in class 1(A-High), the feature points are extracted from an area of 12.8 mm×12.8 mm, and these feature points data are verified by comparison of ridge line directions; when the quality is in class 2(B-Medium), feature points are extracted from an area of 19.4 mm×19.4 mm, and these feature points data are verified by comparison of feature points data(not including the Relations); and when the quality is in class 3(C-Low), feature points are extracted from an area of 25.6 mm×25.6 mm, and these feature points data are verified by comparison of feature points data including the Relations.

At step B4, the feature points extraction unit 32 extracts feature points data which are necessary for verification method read out from the verification method dictionary 6, and stores the data in the third buffer memory of the controller 31.

At step B5, data in the third buffer memory are compared to those in the fifth buffer memory by the verifier unit 36 according to the verification method determined with reference to the verification method dictionary 35 by the quality grade of the fingerprint image. The verification methods for the verifier unit 36 are stored in the program memory in the controller 31, and a verification method is selected in accordance with data in the fourth buffer memory in the controller 31.

These verification methods have heretofore been well known. For example, a Japanese Patent Application which was laid open as a Provisional Publication No. 142676/'84 discloses a verification process using ridge line directions, and a Japanese Patent Application which was laid open as a Provisional Publication No. 24675/'81 discloses a verification process using feature points and the Relations.

At step B6, result of the verification is output to the output unit 4. When similarity of the two data in the third and in the fifth buffer memory is found to be larger than a predetermined threshold value, the two data are recognized as identical.

As mentioned in a foregoing paragraph, the principle of this invention is in the fact that quality grade of a fingerprint image does not change by occasions of input. In general, the time required for verification will become larger when verification process is made more complex for increasing reliability of verification. But, for a fingerprint image having a high grade of quality, a simple verification method can obtain a reliable verification result. And in a fingerprint verification apparatus used for individual person identification, the registered fingerprint data are known before comparison. Therefore, when the quality grade of the fingerprint image is determined at the time of registration, a verification process which is most adapted to the quality grade of the image can be selected in order to decrease the time of verification without decreasing the reliability of the verification.

Heretofore, this invention has been described on preferred embodiments, but it must be noted that this invention is not limited by these embodiments. For example, registered fingerprints data are stored in the data base 34 of the data processor 3. But, the registered fingerprints data may be stored in such a portable memory as a magnetic stripe card or an IC card.

And in another modification, a process for enhancing fingerprint image may be performed, and degree of enhance may be changed in accordance with quality grade of the fingerprint image. In this enhance, a complex process, for example, ridge line extraction process using a directional filter in a direction of a ridge line, is used for a fingerprint image of a low quality grade, and a simple process, such as a histogram smoothing process is used for a fingerprint image of high quality grade in order to reduce processing time.

When the process for enhancing fingerprint image is used, an item of image enhance is supplemented in the verification method dictionary 35. The ridge line extraction process using a directional filter is disclosed in detail in a Japanese Patent Application which is laid open as a Provisional Publication No. 77138/'76.

For another example of data for verification in the verification method dictionary 35, the threshold values of similarity in comparison may be changed in accordance with the quality grade of the fingerprint image. For example, allowable ranges of positions of feature points are made larger for an image of low quality to match distorted fingerprint, while these allowable ranges are made smaller for an image of high quality to decrease the time of comparison.

As described in a foregoing paragraph, an average time required for verification is decreased by this invention with no sacrifice on the accuracy of the verification.

What is claimed is:

1. An apparatus for fingerprint verification comprising:

a data base wherein feature points data and quality grade data of fingerprints to be verified are registered with a respective register number of each fingerprint as an index for access, a register number input unit for generating the register number of a fingerprint to be compared, a fingerprint image input unit for generating a fingerprint image of said fingerprint to be compared, a feature points extraction unit for extracting feature points data of said fingerprint image from said fingerprint image input unit, and a verifier unit for comparing said feature points data extracted from said fingerprint image and the feature points data read out from said data base, wherein one of a plurality of different verification methods is assigned in accordance with quality grade data, and said verifier unit determines the one verification method for said fingerprint to be compared in accordance with the quality grade data associated with the register number of said fingerprint to be compared, and wherein the verifications methods are based on one of feature points extraction area, ridge line direction, feature points, and feature points and relations.

2. An apparatus for fingerprint verification of claim 1, further comprising a quality grade extraction unit for extracting quality grade of a fingerprint image; wherein said fingerprint image input unit, said register number input unit, said feature points extraction unit, and said quality grade extraction unit are used for registering feature points data and quality grade data in said data base.

3. An apparatus for fingerprint verification of claim 1, wherein a different size of area from which feature points data are to be extracted is assigned for each different quality grade data.

4. An apparatus for fingerprint verification of claim 1, further comprising a verification method dictionary which contains the different verification methods cross-referenced with different quality grade data.

5. An apparatus for fingerprint verification of claim 1, wherein a different allowable range of comparison is assigned for each different quality grade data.

6. An apparatus for fingerprint verification of claim 1, wherein a different process of enhancing ridge lines is assigned for each different quality grade data.

7. A method for verifying a fingerprint, comprising the steps of:

generating a fingerprint image of said fingerprint;

receiving a register number input of said fingerprint;

extracting feature points data of said fingerprint;

retrieving from a database, feature points data and quality grade data associated with said register number input;

selecting from a plurality of verification methods a verification method in accordance with the quality grade data associated with said register number input; and comparing the feature points data of said fingerprint and the feature points data read out from said database using the selected verification method, wherein the verifications methods are based on one of feature points extraction area, ridge line direction, feature points, and feature points and relations.

8. The method according to claim 7, wherein the step of selecting includes the step of selecting a size of area from which feature points data are to be extracted in accordance with the register number input.

9. The method according to claim 7, wherein the step of selecting includes the step of selecting a different allowable range of comparison in accordance with said register number input.

10. The method according to claim 7, wherein the step of selecting includes the step of selecting a different process of enhancing ridge lines in accordance with said register number input.

* * * * *